(No Model.) 4 Sheets—Sheet 2.
M. NADIEIN.
APPARATUS FOR OBTAINING, SEPARATING, AND DISINFECTING FERTILIZERS.
No. 531,692. Patented Jan. 1, 1895.
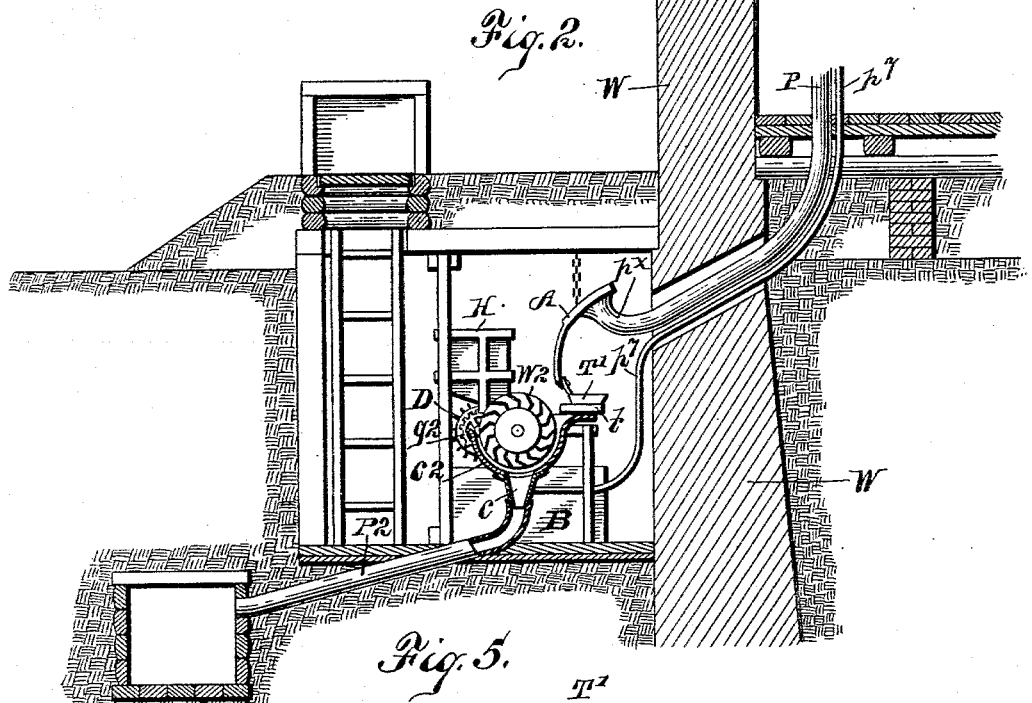
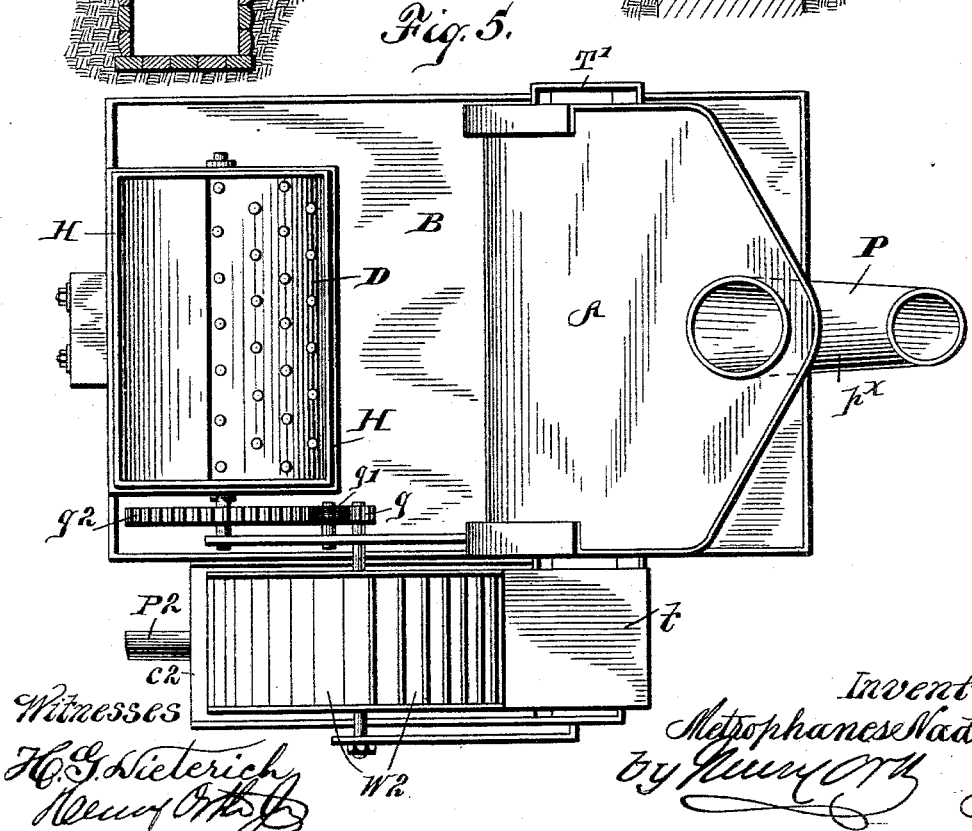

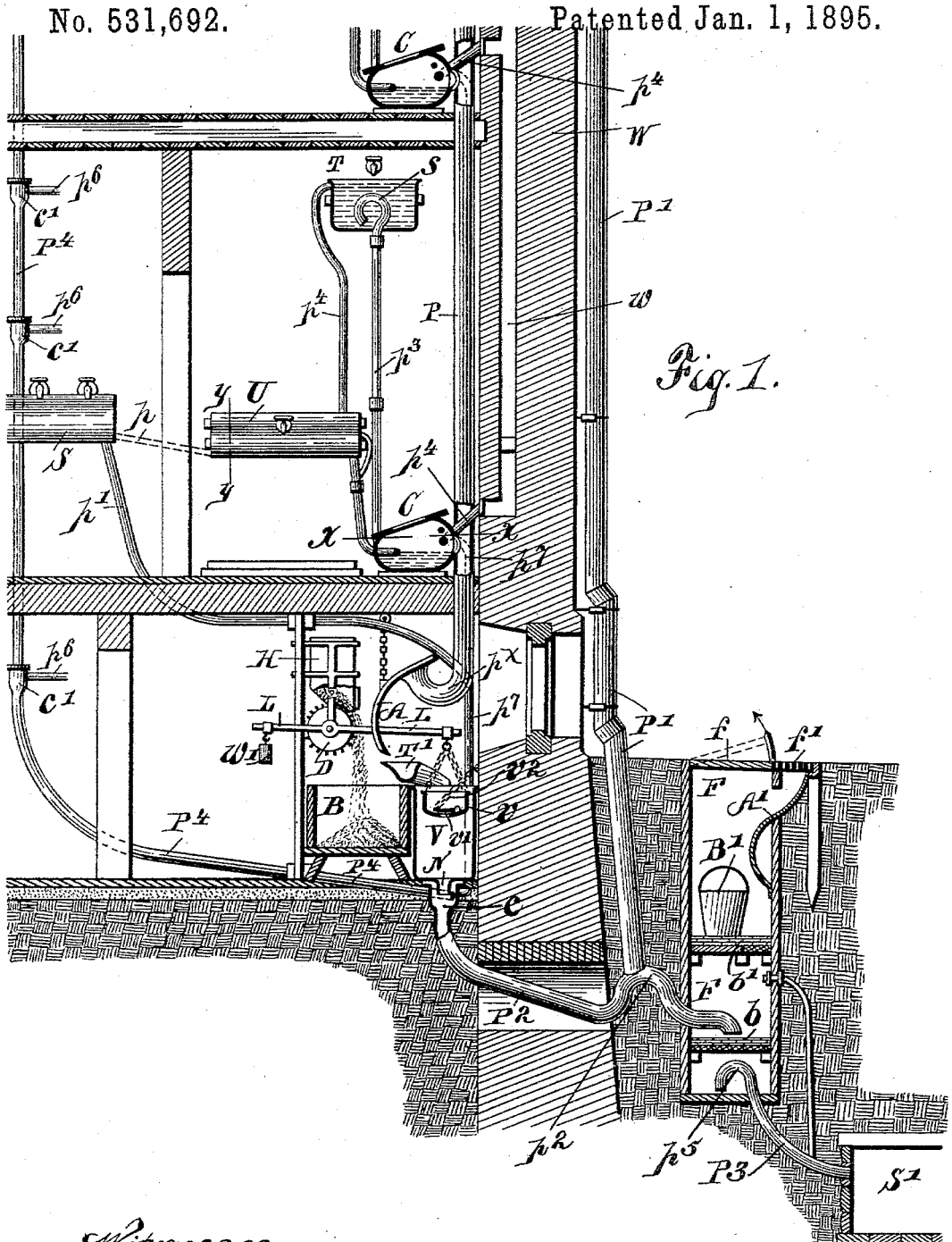

(No Model.) 4 Sheets—Sheet 3.
M. NADIEIN.
APPARATUS FOR OBTAINING, SEPARATING, AND DISINFECTING FERTILIZERS.
No. 531,692. Patented Jan. 1, 1895.
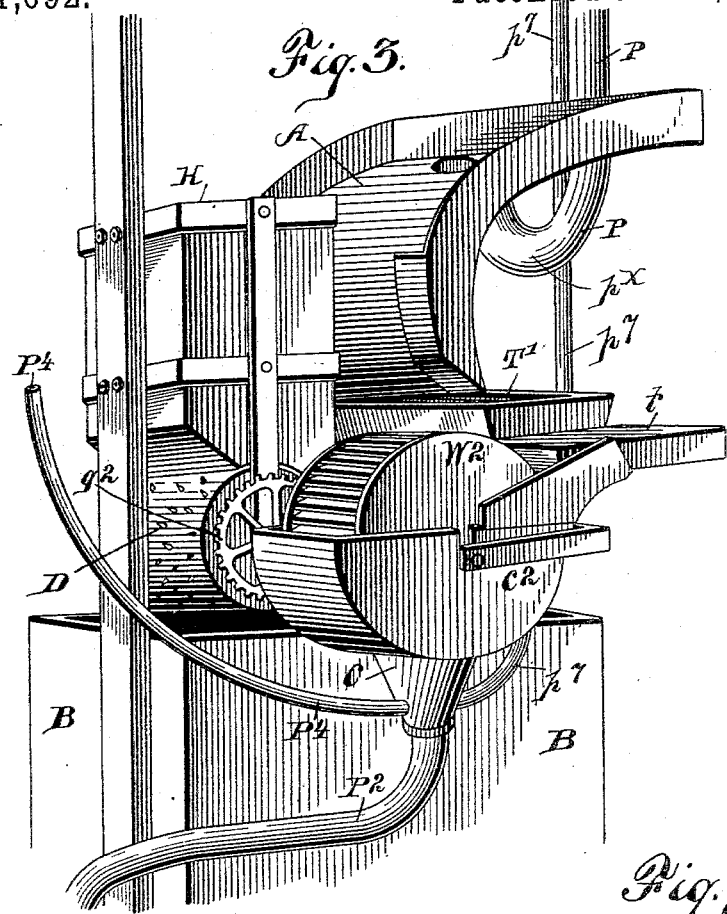
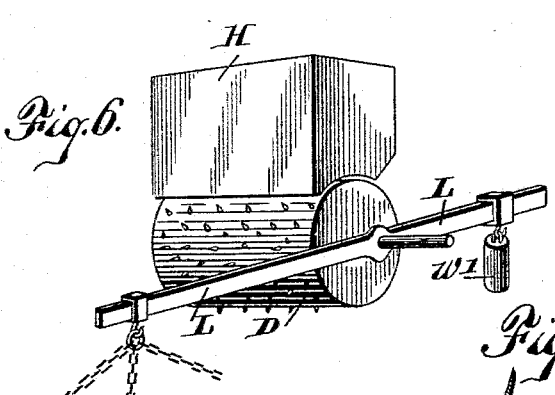
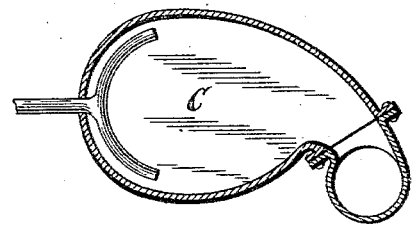
Witnesses:
H. G. Dieterich
Henry Orth
Inventor:
Metrophanes Nadiein
by Henry Orth
Atty.

(No Model.) 4 Sheets—Sheet 4.
M. NADIEIN.
APPARATUS FOR OBTAINING, SEPARATING, AND DISINFECTING FERTILIZERS.
No. 531,692. Patented Jan. 1, 1895.
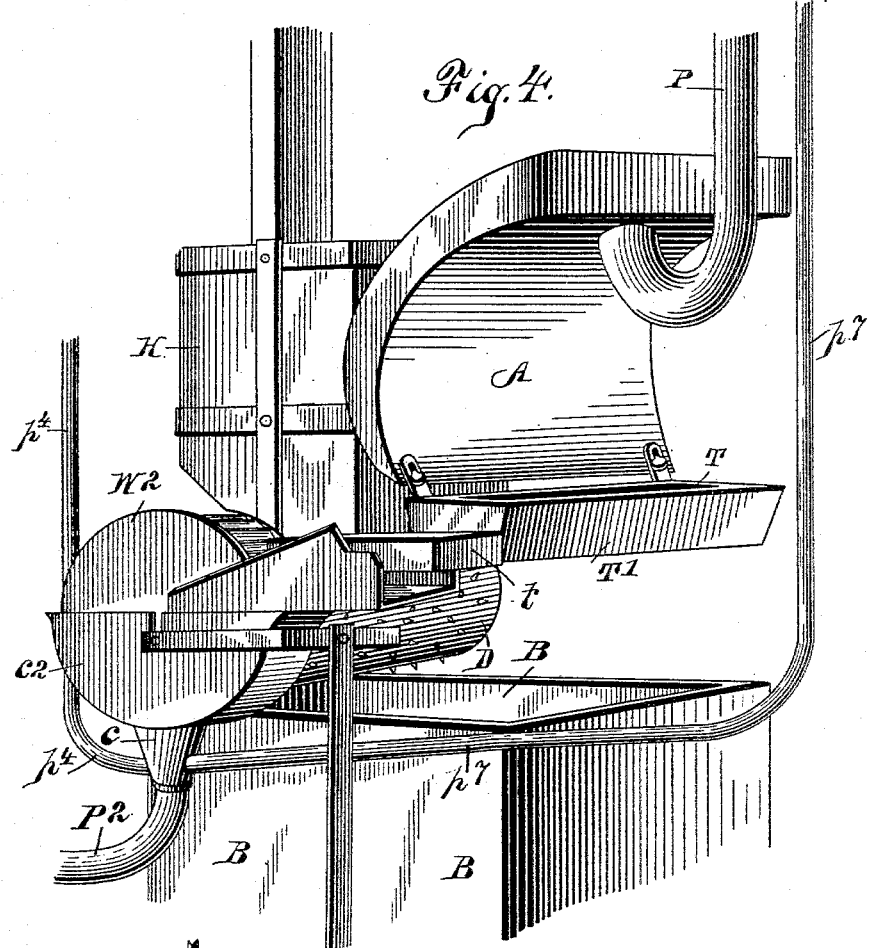
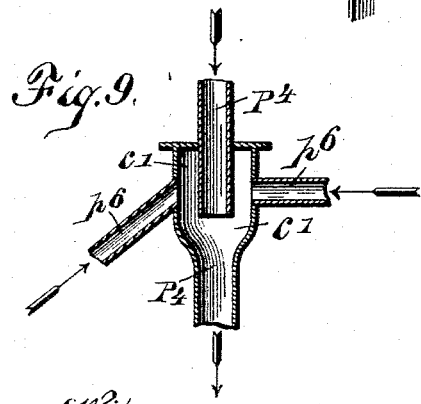
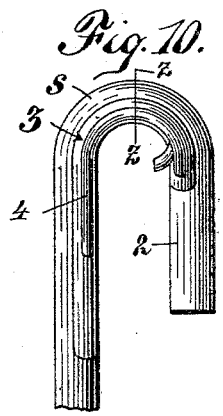
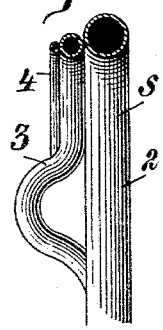
Witnesses:
Inventor:
Metrophanes Nadiein

UNITED STATES PATENT OFFICE.

METROPHANES NADIEIN, OF ST. PETERSBURG, RUSSIA.

APPARATUS FOR OBTAINING, SEPARATING, AND DISINFECTING FERTILIZER.

SPECIFICATION forming part of Letters Patent No. 531,692, dated January 1, 1895.

Application filed June 26, 1894. Serial No. 515,787. (No model.)

*To all whom it may concern:*

Be it known that I, METROPHANES NADIEIN, a subject of the Emperor of Russia, residing at St. Petersburg, in the Empire of Russia, have invented certain new and useful Improvements in Apparatus for Obtaining, Separating, and Disinfecting Fertilizer; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention has relation to sanitary drainage for dwellings and other buildings, and it has for its object the separation of the solid excrementitious and other refuse matter from fluid constituents and from water, as the water used in flushing the closets and other waste water, and the defecation of said solid matter, or its conversion into a fertilizer, as will now be fully described, reference being had to the accompanying drawings, in which—

Figure 1 is a sectional elevation of a portion of a building illustrating a system of drainage embodying my invention. Fig. 2 is a similar view in which the separating and defecating appliances are shown as located outside of the building. Figs. 3 and 4 are perspective views illustrating a modification in the means for actuating the device that controls the distribution of the disinfectant or other material to be spread upon the excrementitious matter, Fig. 5 being a top plan view of said devices. Fig. 6 is a perspective detail view of the disinfectant distributing devices shown in Fig. 1. Fig. 7 is a section of the closet hopper taken on line $x$—$x$ of Fig. 1. Fig. 8 is a similar view of the urinal U, taken on line $y$—$y$. Fig. 9 is a sectional view of one of the connections of two sections of drain pipe, and Figs. 10 and 11 show my improved siphon in side elevation and cross section respectively, the section Fig. 11 being taken on line $z$—$z$—, of Fig. 10.

Referring to Fig. 1, P, indicates the main soil pipe that is carried from the upper to the lower story of the building through the water closets or bath rooms on the different floors, and in the wall W along which the pipe is run, is formed a ventilating channel $w$. Along the outside of said wall W is run the drain pipe P', that takes the water from the roof, though said pipe may be located at any other point of the building and suitably connected with the sewer soil pipe hereinafter referred to.

S indicates a wash-stand or sink, and U a urinal, the two being preferably connected by a pipe $p$ so that the waste water from the sink will flow into the urinal, or said wash stand may be connected directly with the soil pipe P, by a pipe $p'$. When connected with the urinal the pipe $p$ receives the waste water from a siphon $s$ of peculiar construction, shown in detail in Figs. 9 and 10. The said siphon consists of a main siphon 2 and two auxiliary siphons 3 and 4 of successively decreasing diameter and length of legs, the long legs of the auxiliary siphons communicating with each other and with the like leg of the main siphon. The object of this construction is to provide means for intermittingly discharging the water held in the bottom of the washstand. The large siphon will not operate until the water fills the bend or neck thereof, and as said larger siphon is of considerable diameter a corresponding column of water will be required to set it in operation. To avoid this I provide the auxiliary siphons 3, and 4, the smallest siphon 4, being started first by a comparatively small quantity of water, thereby forming a partial vacuum in siphon 3, the diameter of which is about twice that of siphon 4 and about one-half that of the siphon 2, while the short leg of both auxiliary siphons is considerably shorter than that of the main siphon. Siphon 3 being started with an increased flow of liquid, a partial vacuum will be produced in the main siphon, a sudden rush of a comparatively great volume of water being directed into the vessel to be flushed, as the urinal U.

Although it is not absolutely necessary that a wash-stand or kitchen sink should be provided with a water receptacle and a discharge siphon of the construction described, yet I prefer this for the reason that the siphon itself is an effective safeguard against the escape of noxious gases. Any suitable means may be provided for supplying the necessary ater to the urinal U, irrespective of the supply from the wash stand S, as, for instance, from a flushing tank T, which may be provided with well known means for automatically and periodically supplying a quantity of water to said urinal, or a continuous flow of water may be supplied thereto through pipe $p^4$, a float operated valve controlling the supply of water to the tank, being provided. The said tank T is also connected by a pipe $p^3$ through a siphon $s$ of the construction described, with the bowl or pan of a closet C, connected by pipe $p^4$ with the ventilating duct $w$ in wall W, and in the usual manner with the main soil pipe P that terminates below the basement or cellar ceiling in a goose neck $p^x$. The closet bowl C is also connected by a pipe $p^7$ with the chamber $c$, at the end of the branch soil pipe $P^2$, for purposes presently explained.

The discharge of the soil pipe P is surrounded by a delivery board or chute A, preferably made of galvanized or other sheet metal, the surface of which is of such curvature, as for instance a parabolic or like curve, that solid matter moving along the same will be thrown off before it reaches the lower edge of the plate, while the liquid will follow the curvature of said plate to its lower edge and fall into a trough T' while the solid matter falls into a box B.

A vessel V open at top receives the liquid from a smaller vessel $v$ provided in its bottom with a valve port normally closed by a flap valve $v'$ connected by a cord or chain $v^2$ to some stationary body as the wall W. The smaller vessel $v$ is suspended from the long arm of a lever L fulcrumed on the shaft or one of the journals of a drum D that performs the function of a valve for the lower open end of a hopper or reservoir H, in which is stored a disinfectant or other material that is to be spread onto the solid matter to disinfect or otherwise deodorize the same and convert it into a fertilizer.

The drum D in its construction will vary according to the material used. Thus if a finely pulverized disinfectant or deodorizing agent is used, the drum D is provided with a peripheral bucket adapted to receive a proper supply of disinfectant or deodorizing material and drop the same into the box B and onto the solid matter therein whenever the small vessel $v$ has received sufficient liquid to draw the long arm of lever L down, thereby imparting a partial rotation to the drum D and causing the discharge of such disinfectant or deodorizing agent, said drum being returned to its normal position by a weight $w'$ adjustable on the short arm of the aforesaid lever L, whereby the frequency of the delivery of the disinfectant or deodorizing material can be regulated. As the smaller vessel $v$ descends, the valve $v'$ opens by reason of its chain connection with a fixed support, and the liquid contents are discharged into the larger vessel V.

When a fibrous deodorizing material is used, as peat or cotton or like waste, the drum D is provided with spikes, as shown between which such material settles and is discharged into box B, whenever said drum is partially rotated by the vessel $v$.

The larger vessel V has a contracted outlet constructed in the form of a nozzle N that projects into an annular chamber $c$ formed at the upper end of the branch soil pipe $P^2$ with which chamber the vessel V is connected air tight.

It is obvious that when the contents of vessel $v$ are discharged, the rush of fluid through nozzle N will produce a partial vacuum in chamber $c$, and as this chamber is connected with the closet bowl C by pipe $p^7$ as hereinbefore set forth, and may further be connected with an auxiliary waste pipe or pipes as hereinafter explained, air will also be drawn from said pipes, said air combining with the liquid and being entrained thereby into the sewer, the devices performing the function of a ventilator for vessel V, bowl C, and said auxiliary pipe or pipes.

The branch soil pipe $P^2$ is provided with a goose neck $p^2$ to form a water luting on the lower side of the pipe, and to said goose neck is connected the outside or roof drain pipe P', which thus performs the function of a ventilating pipe for the sewer side of the branch soil pipe $P^2$. The latter pipe discharges onto a filter bed $b$ formed in a pit F outside the building at the curb, said pit being normally closed by a cover $f$ and on the street side has a grating $f'$. Below the grating $f'$ is arranged a separator plate A' of substantially the same construction as the plate A hereinbefore referred to and for a similar purpose, the solid matter being received in a trough or bucket B' on a second filter bed $b'$. The sewer S' is connected with the lower part of the pit F by means of a pipe $P^3$ whose receiving end is bent downwardly in the form of a goose neck $p^5$ the mouth of which lies close to the bottom of said pit F whereby a seal is formed on the sewer side of said pit for the purpose of preventing the passage of noxious gases from the sewer to the pit.

It will readily be seen that clear liquid alone is discharged into the sewer, all solid matter being separated therefrom and retained either in the box B or the bucket B' or the filter beds $b$ and $b'$, such solid matter being removed from time to time, and may be used as a fertilizer, the filtering material used being preferably of such a nature as to readily mix with or become decomposed when spread upon the ground and plowed in.

A pipe $P^4$ may extend through various apartments of a house, and may be connected with wash stands, sinks, or the like, and with the chamber $c$ at the receiving end of the branch soil pipe $P^2$, and said pipe $P^4$ is preferably constructed in sections, each of which terminates in a cup $c'$ of considerably greater diameter than the pipe itself, into which cup the section of pipe next above dips and discharges, so that here also a partial vacuum will be formed, whereby air is drawn into the cup $c'$, to which branch pipes as $p^6$ $p^6$ are connected, acting as ventilating pipes or as lateral drains, as shown in detail, Fig. 9.

In Figs. 2, 3, 4, and 5, I have illustrated a modification in the means for operating the distributing drum D. On the chamber $c$ of the branch soil pipe $\Gamma^2$ is a casing $c^2$ for an overshot water wheel $W^2$, the liquid from separator plate A and its trough $T'$ discharging through a lateral duct $t$ onto the wheel whereby the latter is revolved, the rotation of the water wheel being communicated to the drum D through the gearing $g$ $g'$ $g^2$, Figs. 3 and 5.

It will be seen that in either of the constructions shown and described, the drum D is controlled by the waste liquid, but in the construction shown in Figs. 2 to 5, a drum having peripheral bucket or series of buckets could not be employed for the reason that the amplitude of the rotation of the drum D is a variable one, depending upon the volume of liquid discharged. This may, however, be avoided by interposing between the separator plate and the trough $T'$ a vessel such as $v$, adapted to discharge the liquid supplied thereto in measured quantities, as will be readily understood. Of course it is not absolutely necessary that all of the liquid drainage should be filtered before its discharge into the sewer, as shown in Fig. 2, the object of filtering such liquid being chiefly to obtain therefrom all that is possible for use as a fertilizer, and instead of using filtering materials such as described, well known chemicals may be used, adapted to decompose the liquid, so that pure water will pass to the sewers, whereby the escape of dangerous sewer gases would be effectually avoided.

Having thus described my invention, what I claim as new therein, and desire to secure by Letters Patent, is—

1. In a system of drainage, the combination with the main soil pipe having its discharge end curved upwardly, of a separator comprising a plate encompassing the outlet of said pipe, said plate having a receiving and discharging surface of such curvature as to throw off solid matter at a point intermediate of the receiving and discharging ends of said plate, for the purpose set forth.

2. In a system of drainage, the combination with the main soil pipe, a separator adapted to separate the solid from the liquid constituents of the sewage discharged from said pipe, separate receivers for the solid and liquid constituents, and a disinfectant or deodorant distributer, adapted to discharge into the receiver for the said solid constituents, of a two armed lever adapted to actuate said distributer, a weight on one arm, and a vessel suspended from the other arm of said lever, said vessel adapted to receive liquid from the separator and discharge the same into the receiver therefor whenever the weight of the liquid in said vessel exceeds that on the lever arm, for the purpose set forth.

3. In a system of drainage, the combination of a branch soil pipe connected with the sewer and having an enlarged inlet, a receiver for the liquid constituents of the sewage connected with said inlet to form a closed chamber, as $c$, said receiver having a discharge nozzle projecting into said enlarged inlet, a main soil pipe, and a separator interposed between the receiver and main soil pipe adapted to separate the solid from the liquid constituents of sewage fed thereto from said main soil pipe, and discharge such liquid constituents into the aforesaid receiver, and a ventilating branch connecting the enlarged inlet of the branch soil pipe with a closet or the like, substantially as and for the purpose set forth.

4. In a system of drainage, the combination of a branch soil pipe connected with the sewer and having an enlarged inlet provided with one or more ventilating pipes, a receiver for the liquid constituents of the sewage connected with said inlet to form a closed chamber, as $c$, said receiver having a discharge nozzle projecting into said enlarged inlet, a main soil pipe, a separator adapted to separate the solid from the liquid constituents of the sewage, a collecting vessel interposed between the aforesaid receiver and the separator adapted to collect the liquid sewage and discharge the same intermittingly into such receiver, substantially as and for the purpose set forth.

5. In a system of house drainage, the combination with a branch soil pipe, a main soil pipe adapted to receive the house sewage, and a separator interposed between said pipes adapted to discharge the liquid constituents of such sewage into the branch soil pipe; of a filter chamber on the street side of the premises adapted to receive the liquid sewage from the branch soil pipe and sewage from the street, a separator adapted to separate the solid from the liquid street sewage before the latter reaches the filter, and means for educting the filtrate from the chamber, for the purposes set forth.

6. In a system of drainage, the combination with the soil pipe provided with a receiving vessel on the sewer side of the sewage feeding device or devices, a separator adapted to separate the solid from the liquid constituents of the sewage fed to the pipe, a disinfectant or deodorant reservoir, a revoluble discharge therefor, a weighted lever on the axis of rotation of said device, and a vessel suspended from said lever and adapted to receive the liquid constituents from the separator and discharge the same into the aforesaid receiving vessel whenever the weight in the suspended vessel exceeds that on the lever, for the purpose set forth.

7. In a system of drainage, the combination with the soil pipe, of a separator adapted to separate the solid from the liquid constituents of the sewage fed to such pipe, a vessel adapted to receive the liquid constituents and discharge the same into the soil pipe, a valve closing the discharge of said vessel, a box for receiving the solid constituents of such sewage, and a disinfectant or deodorant reservoir having a movable discharge device above the said box, the said discharge device together with the discharge valve of the aforesaid vessel adapted to be controlled by the separated liquid sewage, for the purpose set forth.

In testimony whereof I have signed my name to this specification in the presence of two subscribing witnesses.

METROPHANES NADIEIN.

Witnesses:
N. TSCHEKALOFFELL,
J. FLIERLING.